May 13, 1958

T. A. RICH 2,834,933

ELECTRICAL PEAK FOLLOWER CIRCUIT

Filed Oct. 13, 1954

Inventor:
Theodore A. Rich,
by Milton D Moore
His Attorney.

United States Patent Office 2,834,933
Patented May 13, 1958

2,834,933

ELECTRICAL PEAK FOLLOWER CIRCUIT

Theodore A. Rich, Schenectady, N. Y., assignor to General Electric Company, a corporation of New York Application October 13, 1954, Serial No. 462,021

2 Claims. (Cl. 323—22)

This invention relates to a circuit for following the peaks of alternating electrical energy, and more particularly to such a circuit as will follow decreasing as well as increasing electrical peaks with a minimum of delay.

It is frequently desired to convert A.-C. to D.-C. with a minimum of ripple or time delay, and many uses for a circuit accomplishing this can be found, especially where the A.-C. has a low frequency. Such a circuit could be used in a peak voltmeter for measuring the peaks of A.-C. energy. Also, this circuit could be used in connection with servo mechanisms to avoid oscillations due to a time lag caused by a slow response rectifier circuit. Another use for such a circuit would be as an A.-C. voltage regulator for obtaining a direct current to be compared with a standard direct current. Such a regulator would be particularly useful on X-ray machines where the output is highly sensitive to the peak voltage. This circuit could also be used in a ratio meter, where it is desired to determine the ratio between the peaks of two input voltages.

One circuit which will follow the peaks of an A.-C. input is that of a rectifier in series with a capacitor, the A.-C. input being connected across the series arrangement. The voltage across the capacitor will rapidly attain the value of the peak voltage of the A.-C. input as long as the voltage increases. However, when the voltage decreases, the capacitor tends to hold its charge. This defect noted in conection with the rectifier-capacitor arrangement, is common to all of the circuits known to the art; namely, such circuits do not respond to decreasing peaks as rapidly as they do to increasing peaks. The present invention is designed to provide a rectifier circuit for use in any and all of the above-noted equipments and which will have a fast response to either increasing or decreasing alternating electrical energy peaks.

It is, therefore, one object of this invention to provide a circuit which will follow electrical energy peaks with a minimum time lag.

It is another object of this invention to provide a circuit which will follow decreasing as well as increasing peaks of alternating electrical energy.

It is a further object of this invention to provide a rectifier circuit for converting A.-C. to D.-C. with a minimum of ripple.

Other objects and advantages will appear as the description of the invention proceeds.

In accordance with the invention, a first normally open electronic switch, such as a biased triode, is provided and this switch is closed by the peaks of the electrical pulses which it is desired to follow. In series with this switch is an electrical energy storage device, such as a capacitor, which is charged to the value of the peak voltage applied to the switch whenever the switch is closed. Connected across the capacitor in parallel therewith is a second electronic switch, such as a triode, also receptive of the electrical input pulses applied to the first-mentioned switch and having a resistor-capacitor self-biasing network in series therewith. When the first switch is closed by an input electrical pulse, it charges its associated capacitor to the value of the input pulse, and the capacitor will remain at this value until the second switch is closed. This second switch only becomes operative when its associated capacitor has discharged sufficiently through its associated resistor to reduce the self-bias of the switch. Upon its operation, the second switch serves to discharge the first-named capacitor to a value slightly below the peak of the first input electrical pulse. Now the first-named capacitor is ready to rise to the value of the next input electrical peak regardless of whether this next peak is larger or smaller than the first peak. The output of this circuit is taken across this first-named capacitor. By adjusting the value of the self-bias of the second switch, it is possible for any given input to have the first-named capacitor follow successive input electrical peaks with a minimum variation in its amplitude. By means of this invention, it is now possible to obtain a fast response peak follower circuit which will change A.-C. to D.-C. with a minimum time lag.

The features of this invention which are believed to be novel and patentable are pointed out in the claims which form a part of this specification. For a better understanding of the invention, reference is made in the following description to the accompanying drawing, wherein like parts are indicated by like reference numerals, in which:

Figure 1:
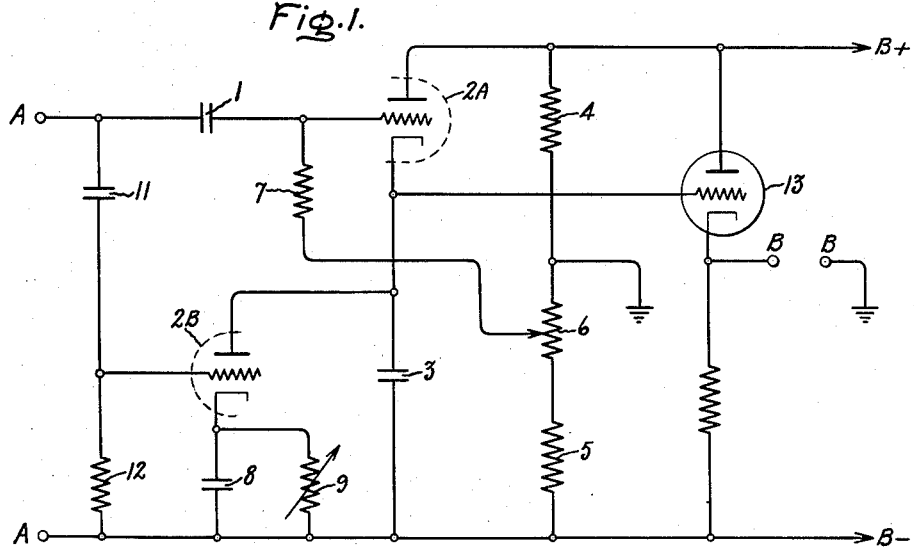
Fig. 1 is a circuit diagram of the invention.

Referring now to Fig. 1, there is shown a pair of input terminals A—A across which is applied the alternating electrical energy whose peaks this circuit is designed to follow. This energy is applied through a coupling capacitor 1 to the control grid of an electronic switch tube 2A, a tube shown as being half of a dual triode. The cathode of this tube is connected to one side of a capacitor 3, the other side of this capacitor being connected to a source of negative potential labelled B—, this source of potential also being connected to the bottom input terminal A. The anode of switch tube 2A is connected to a source of positive potential labelled B+. Connected between this positive source of potential and ground reference potential is a resistor 4; and connected between the source of negative potential and ground are a pair of series connected resistors 5 and 6, resistor 6 being a potentiometer whose movable arm leads through a resistor 7 to the control grid of tube 2A. Connected across capacitor 3 in parallel therewith is an electronic switch 2B, shown as the second half of the dual triode noted above, the anode of this tube ebing connected to the top side of capacitor 3 and the cathode of this tube being connected through a capacitor 8 and a resistor 9 to the other end of capacitor 3. Capacitor 8 and resistor 9 are connected in parallel and form the usual type of self-bias network that is well known to the art, resistor 9 being a variable resistance in order that the self-bias of tube 2B may be changed. The input electrical energy is also coupled to the control grid of tube 2B through a coupling capacitor 11, this control grid being coupled to the source of negative potential through a resistor 12. A cathode follower 13 takes the output derived across capacitor 3 in a manner well-known to the art, and this output appears from the cathode of this tube to the ground at output terminals B—B.

Figure 2:
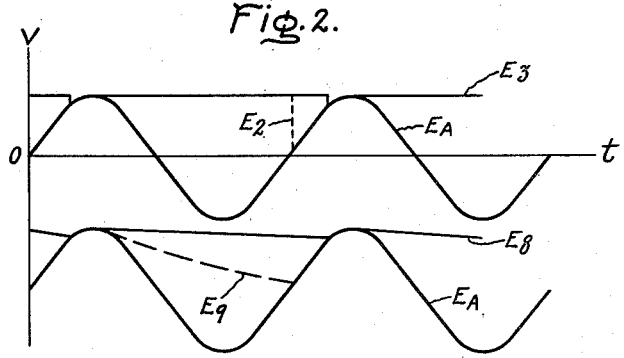
Fig. 2 is a diagram showing the wave forms of voltages versus time at various points in the circuit of Fig. 1.

Referring now also to Fig. 2, the operation of Fig. 1 will be explained. Fig. 2 is a plot of voltage against time, as indicated thereon, at various points in the circuit. The input A.-C. voltage appearing across terminals A—A of Fig. 1 is shown as $E_A$, this voltage appearing twice in Fig. 2. The topmost appearance of $E_A$ is taken at the control grid of switch tube 2A, whereas the bottom appearance of this voltage is taken at the control grid of tube 2B and is superimposed upon the negative bias potential applied to this tube. These two wave forms are therefore identical but are merely displaced. Following the peaks of the top and bottom input voltages $E_A$, are, respectively, voltages $E_3$ and $E_8$ taken across capacitors 3 and 8, respectively. Switch tube 2A is normally biased to cut-off by the negative potential applied to its control grid from potentiometer 6; and switch tube 2B is normally biased to cut-off by the positive potential applied to its cathode from capacitor 8 and resistor 9. In operation, the positive peak of the input A.-C. potential $E_A$ causes switch tubes 2A and 2B to conduct, charging capacitors 3 and 8 to the highly positive value of the input wave form voltage peak. As soon as the input voltage peak drops off, switch tubes 2A and 2B return to their normally cut off states. Capacitor 3, having no discharge path, remains at the peak of its charged potential. However, capacitor 8 gradually discharges through variable resistor 9. This discharge is shown in exaggerated form by a dotted line in Fig. 2 labelled $E_9$, the time constant of capacitor 8 and resistor 9 being made extremely small in order to produce this exaggerated action. As will be seen from $E_9$, the bias at the cathode of tube 2B drops rapidly until it is overcome by the next input positive voltage peak. Where these two intersect is the point that switch tube 2B can conduct. Upon conduction at the aforementioned coincidence point, tube 2B serves to provide a discharge path for capacitor 3. As shown by the dotted line $E_2$, capacitor 3 discharges almost instantly down to the point where its potential is equal to that of the input A.-C. voltage, whereupon capacitor 3 will charge to the peak value of the input voltage again. The above operation is repeated for each succeeding input voltage peak. The conduction of switch tube 2B during the time when capacitor 3 is being charged has very little effect upon the charging of this capacitor since this capacitor has a charge path with a much smaller impedance than its discharge path. In actual operation, the RC time constant of capacitor 8 and resistor 9 are so chosen that capacitors 3 and 8 closely follow the peaks of the input A.-C. potential, as shown by the wave forms labelled $E_3$ and $E_8$, respectively. $E_3$ is the output voltage which appears at terminals B—B of cathode follower 13.

In the circuit actually built and tested, capacitors 1, 3, 8, and 11 had values of 0.5 $\mu f.$, resistors 7 and 12 had values of 1 megohm each, resistor 9 had a value of 390,000 ohms, resistor 4 had a value of 10,000 ohms, potentiometer 6 had a value of 500 ohms, resistor 5 had a value of 5,000 ohms, and the cathode resistor of the cathode follower had a value of 22,000 ohms. Tube 2 was a 12AX7. With a circuit according to this invention and having the above-noted element values, and with an input signal of 5 cycles per second, extremely fast response was obtained to variations in the value of peak voltage but on steady state the ripple was small; when used with a recording instrument the response was limited by the instrument rather than filter circuit and yet there was no observable ripple in the record. This circuit followed decreasing as well as increasing voltage peaks and more than fulfilled the objects of the invention.

It should be understood that this invention is not limited to any particular kind of electronic switch such as 2A and 2B, since many suitable electronic switches are known to the art and could be used to replace those shown in Fig. 1 Moreover, cathode follower 13 is not a part of this invention but is merely a convenient way of deriving an output from across capacitor 3. Further, capacitors 1 and 11 are not necessary to the invention since the same input signals could be directly applied to switches 2A and 2B without these capacitors merely by interconnecting the two control grids of these switch tubes by an isolating resistor, these capacitors merely serving a bias voltage isolation purpose.

While there has been described what is at present considered a preferred embodiment of the invention, it will be obvious to those skilled in the art that various changes and modifications may be made therein without departing from the invention, and it is aimed by the appended claims to cover all such changes and modifications as fall within the true spirit and scope of the invention.

What I claim as new and desire to secure by Letters Patent of the United States is:

1. An electrical peak follower circuit comprising, a first triode having its anode connected to a source of positive potential and being biased to cut-off by means of a bias potential applied to its control grid, said control grid being receptive of positive voltage pulses having sloping rising and falling edges each of which serves to cause said first triode to conduct, a capacitor connected between the cathode of said first triode and a source of negative potential for storing the peak values of said positive voltage pulses transmitted to it whenever said first triode conducts, a second triode having its anode connected to the cathode of said first triode and having its control grid receptive of said positive voltage pulses, said second triode being caused to conduct by said positive voltage pulses and providing a discharge path for said capacitor upon becoming conductive, and a resistor connected in parallel with a capacitor, the parallel combination being connected between the cathode of said second triode and the source of negative potential, the parallel circuit serving to provide a bias for said second triode and having a time constant such that second triode will remain cut off until said positive voltage pulses are near their peaks.

2. An electrical peak follower circuit comprising first normally non-conducting triode switch means receptive of a pulsating voltage having sloping rising and falling edges, the positive peaks of said voltage serving to cause said first triode means to conduct, storage capacitor means connected in series with said first triode means for storing the positive peak values of said voltage when said first triode switch means conducts, second triode means connected across said storage capacitor means for providing a discharge path for said capacitor means upon being made conductive, said second triode means being receptive of said pulsating voltage and made conductive by the positive portion thereof, self-biasing means coupled to said second triode means to produce a bias therefor which varies in magnitude with the peak value of the pulsating voltage whereby said second triode means is maintained non-conducting until said pulsating voltage approaches a positive peak.

References Cited in the file of this patent

UNITED STATES PATENTS

| | | |
|---|---|---|
| 2,466,705 | Hoeppner | Apr. 12, 1949 |
| 2,562,476 | Rado | July 31, 1951 |